United States Patent
Widl et al.

(10) Patent No.: US 11,774,950 B2
(45) Date of Patent: Oct. 3, 2023

(54) METHOD FOR THE ENCRYPTED COMMUNICATION IN A PROCESS PLANT, PROCESS PLANT, FIELD DEVICE AND CONTROL ELECTRONICS

(71) Applicant: SAMSON AKTIENGESELLSCHAFT, Frankfurt (DE)

(72) Inventors: Andreas Widl, Munich (DE); Leon Urbas, Berlin (DE)

(73) Assignee: Samson Aktiengesellschaft, Frankfurt (DE)

( * ) Notice: Subject to any disclaimer, the term of this patent is extended or adjusted under 35 U.S.C. 154(b) by 0 days.

(21) Appl. No.: 16/764,776

(22) PCT Filed: Nov. 14, 2018

(86) PCT No.: PCT/EP2018/081240
§ 371 (c)(1),
(2) Date: May 15, 2020

(87) PCT Pub. No.: WO2019/096849
PCT Pub. Date: May 23, 2019

(65) Prior Publication Data
US 2021/0382459 A1    Dec. 9, 2021

(30) Foreign Application Priority Data
Nov. 15, 2017   (DE) ..................... 10 2017 126 916.9

(51) Int. Cl.
G05B 19/418    (2006.01)
H04L 9/08    (2006.01)

(52) U.S. Cl.
CPC ... *G05B 19/4185* (2013.01); *G05B 19/41815* (2013.01); *H04L 9/0827* (2013.01);
(Continued)

(58) Field of Classification Search
CPC .... G05B 19/41845; G05B 2219/25205; G05B 2219/25312; G05B 2219/25428; G05B 19/41815; G05B 19/41885; H04L 9/0827
See application file for complete search history.

(56) References Cited

U.S. PATENT DOCUMENTS

2002/0039328 A1* 4/2002 Dubinsky ............... E21B 47/16
367/82
2002/0096325 A1* 7/2002 Sonnier ................... E21B 47/18
166/255.3
(Continued)

FOREIGN PATENT DOCUMENTS

DE    20105027 U1    8/2001
DE    102005054685 A1    6/2007
(Continued)

OTHER PUBLICATIONS

International Search Report and The Written Opinion of the International Research Authority dated Feb. 11, 2019, for Application No. PCT/EP2018/081240 (with English Translation).
(Continued)

*Primary Examiner* — Tuan C Dao
(74) *Attorney, Agent, or Firm* — Banner & Witcoff Ltd.

(57) ABSTRACT

In a method for the encryption communication in a process plant, one or more keys for coding of electronic signals regarding the process plant, such as actuation signals, measurement signals, state signals, warning signals or such, are provided. The one or more keys are transmitted as acoustic signal via a ductwork guiding plant fluid, particularly a process fluid or an auxiliary fluid, from the first communication partner to the second communication partner. The process plant can be a chemical plant, a power plant, or a food-processing plant. The communication can be between a first and a second communication partner, which can include at least one field device, such as an actuator for (Continued)

S1: providing a key for coding of electronic signals regarding the process plant

↓

S2: transmitting the key as acoustic signal via a ductwork guiding plant fluid from the first communication partner to the second communication partners adjusting a process fluid and/or a control electronics for supervising, controlling and/or regulating processes of the process plant.

20 Claims, 2 Drawing Sheets

(52) U.S. Cl.
CPC .............. *G05B 2219/25205* (2013.01); *G05B 2219/25312* (2013.01); *G05B 2219/25428* (2013.01)

(56) References Cited

U.S. PATENT DOCUMENTS

| | | | | |
|---|---|---|---|---|
| 2002/0152802 | A1* | 10/2002 | Gysling | G01H 5/00 |
| | | | | 73/61.79 |
| 2002/0189362 | A1* | 12/2002 | Havlena | G01F 15/063 |
| | | | | 73/702 |
| 2002/0190682 | A1* | 12/2002 | Schempf | G01N 29/265 |
| | | | | 318/568.11 |
| 2003/0112978 | A1* | 6/2003 | Rodman | H04K 1/00 |
| | | | | 380/277 |
| 2005/0273609 | A1 | 12/2005 | Eronen | |
| 2006/0101269 | A1* | 5/2006 | Moskowitz | G06F 21/10 |
| | | | | 713/176 |
| 2007/0116293 | A1 | 5/2007 | Busser et al. | |
| 2009/0229672 | A1* | 9/2009 | Yeong-chun | E03C 1/021 |
| | | | | 137/15.01 |
| 2010/0082983 | A1 | 4/2010 | Shah et al. | |
| 2011/0273700 | A1* | 11/2011 | Lambert | G06F 3/0304 |
| | | | | 356/28 |
| 2013/0021167 | A1* | 1/2013 | Harper, Jr. | G05B 9/02 |
| | | | | 340/870.01 |
| 2015/0334336 | A1* | 11/2015 | Chiu | G09G 5/12 |
| | | | | 348/383 |
| 2016/0269876 | A1* | 9/2016 | Senese | H04L 65/104 |
| 2017/0006035 | A1 | 1/2017 | Gilberton et al. | |
| 2017/0149943 | A1* | 5/2017 | Moser | G10K 11/17861 |
| 2018/0058209 | A1* | 3/2018 | Song | G01F 1/74 |
| 2018/0149511 | A1* | 5/2018 | Ploss | G01N 29/12 |
| 2018/0181136 | A1* | 6/2018 | Loosararian | G05B 19/00 |

FOREIGN PATENT DOCUMENTS

| | | |
|---|---|---|
| DE | 102009055763 A1 | 5/2011 |
| DE | 102017200594 A1 | 7/2018 |
| EP | 3043224 A1 | 7/2016 |
| GB | 2524987 A | 10/2015 |

OTHER PUBLICATIONS

German Action dated Sep. 19, 2018, for Application No. 102017126916.9 (with English Translation).

* cited by examiner

METHOD FOR THE ENCRYPTED COMMUNICATION IN A PROCESS PLANT, PROCESS PLANT, FIELD DEVICE AND CONTROL ELECTRONICS

CROSS REFERENCE TO RELATED APPLICATIONS

This patent application is a United States National Stage Application of International Application No. PCT/EP2018/081240, filed Nov. 14, 2018, which claims priority to German Patent Application No. 102017126916.9, filed Nov. 15, 2017, each of which is incorporated herein by reference in its entirety.

BACKGROUND

The disclosure relates to a method for the encrypted communication in a process plant, like a chemical plant, a powerplant, a food-processing plant or such, between at least a first and a second communication partner. The disclosure also relates to a field device, such as an actuator, for example a control valve or a pump, for adjusting a process fluid, which can be one of the communication partners. The disclosure also relates to a control electronics, such as a control center, which can be one of the communication partners. The disclosure further relates to a process plant.

The field device can be driven by means of auxiliary energy, such as pneumatic auxiliary energy, wherein particularly a preferably pneumatic control valve can be actuated particularly via an electropneumatic position controller. Different states can occur in field devices, such as control valves and/or pumps, which influence, particularly control and/or regulate, a process fluid stream in a process plant. For the central control of the processes of a process plant, a control center is generally provided, which supervises or controls several field devices. For this purpose, between the field devices and the control center a communication takes place. It is conceivable that the control center communicates with individual field devices via a network which has interfaces, via which the communication between the field devices and the control center could take place. The communication can for example take place via the internet. In order to inhibit an undesired access to the communication between control center and field devices, a communication can take place encrypted. For the encrypted communication, it is necessary that a receiver is able to receive and decode an encrypted message from a sender. For this purpose, a key between the sender and the receiver can be exchanged. A particularly safe method for the encrypted communication is for example known from the patent application DE 2017 119 406.1. According to this method, a message can for example be generated by a hybrid encryption method, in which a simple, symmetric encryption of a message content takes place and the symmetric key itself is encrypted asymmetrically and communicated separately, for example previously. Compared to communication methods, in which a complete message is encrypted asymmetrically, this can accelerate the communication significantly. The asymmetrically encrypted key can be sent via an unsaved channel, such as an internet connection. The asymmetric encryption itself remains relatively effortful.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the disclosure is to provide an alternative method for the encrypted communication in a process plant, which ensures a fast communication at high data transmission rates and very high access security.

Thus, a method for encrypted communication between at least one first and a second communication partner in a process plant, such as a chemical plant, for example a petrochemical plant, a power plant, for example nuclear power plant, a food-processing plant, for example a distillery, or such is provided. A communication partner of the process plant can be a field device, such as an actuator for adjusting a process fluid of a process plant. A communication partner as a field device can for example be a control valve or a pump. A communication partner can for example be a control electronics, such as a control center of a process plant, for supervising, controlling and/or regulating processes of the process plant. In the case of the method for the encrypted communication between at least one first and a second as well as possibly further communication partners according to the disclosure, at least one of the communication partners is a field device or a control electronics. Preferably, the method for the encrypted communication in a process plant can be executed in a network of a plurality of communication partners of the process plant. A communication network in a process plant can comprise a plurality of field devices and at least one control electronics in the form of a central control center for the central supervision, control and/or regulation of the processes of the plant. The field devices which form communication partners in a communication network in such a process plant, can be different, for example, the plant can comprise several similar and/or several different control valves, several similar and/or several different pumps as well as possibly other field devices, for example measuring devices without actuation function of an actuator.

Figure 2:
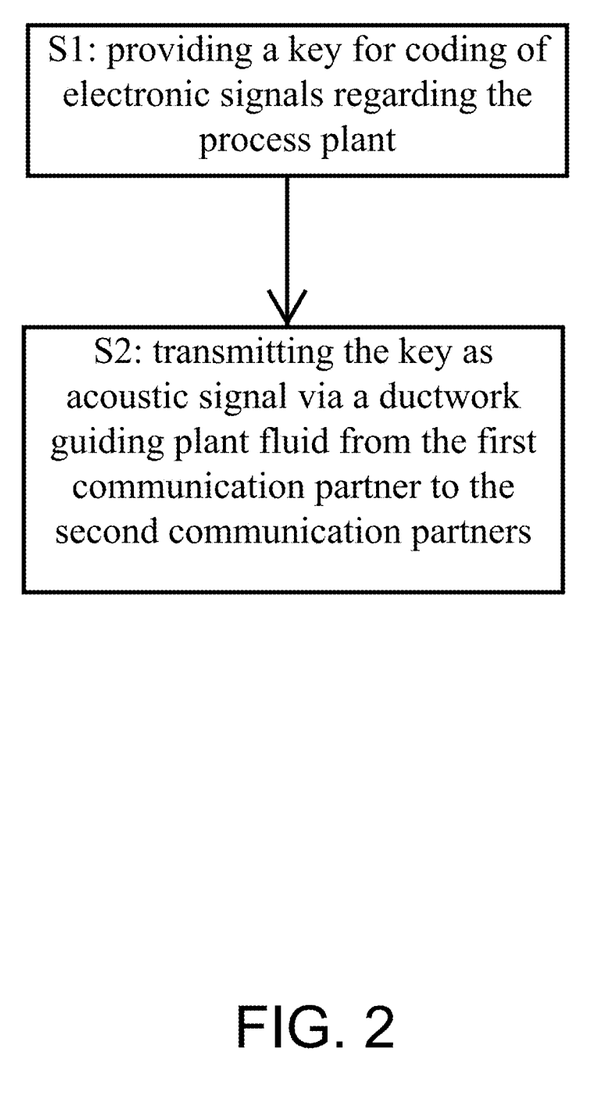
FIG. 2 is a flowchart of a method for the encryption communication in a process plant according to an exemplary embodiment of the present disclosure.

With reference to FIG. 2, in a method according to an exemplary embodiment of the disclosure, a key for coding electronic signals regarding the process plant is provided (S1). The electronic signals, which relate to the process plant, can for example be actuation signals, measurement signals, state signals, warning signals or such. Electronic signals relating to the process plant can be signals which are sent for example from one field device to another field device. Electronic signals relating to a process plant can be sent from a field device to a control electronics. It is possible that electronic signals relating to the process plant can be sent to one or several field devices, starting from a control electronics. The key for coding an electric signal can for example be a one-time key. The coding key can be 8 bit, 32 bit, 64 bit, 128 bit or greater. It can be preferred to use continuously changing keys for the communication of two predefined communication partners. For example, one-time keys can be used which cannot be used again after the one-time use. It is also possible that a key, which is used for the communication of two communication partners of the process plant is replaced in regular time intervals, for example one minute at most, ten minutes at most, one hour at most and/or after a certain number of sent encrypted electronic signals, for example after three messages, five messages or ten messages, by a new key. The provision of a key from the first communication partner for the communication with at least one other communication partner can take place in regular intervals and/or on the request of another communication partner. The provision of a key for coding the electronic signals can comprise the provision of several different keys, which for example can be provided for the encryption of different messages.

According to the disclosure, the key is transmitted as acoustic signal via a ductwork leading the plant fluid from the first communication partner to the second and/or possibly further communication partners (S2 in FIG. 2). The ductwork can for example guide a process fluid of a process plant, which is adjustable by the actuator. The ductwork can guide an auxiliary energy fluid, for example a pneumatic fluid for the actuation of pneumatic position actuators of an actuator. The acoustic signal can for example represent a binary key as amplitude modulated signal, pulse width modulated signal, frequency modulated signal or such. In the case of the method for the encrypted communication in a process plant according to the disclosure, the transmission of the key as acoustic signal, it can be ensured in a simple way with an existing system that an unauthorized access from outside cannot result in the knowledge of the key for coding the electronic signals between the communication partners of the process plant. Tubes guiding fluid in the process plant are used as a secondary communication network for the secure transmission of the communication keys. For the access of this secondary acoustic communication network, a direct physical access to the process plant is necessary. By that, it is ensured that also in the case for an unsecure network for the communication of electronic signals regarding the process plant is used between the communication partners a second, physically isolated from this network and therefore secure communication network is provided. The method according to the disclosure allows the retrofit of existing process plants for the significant increase of operation safety without impairing possibly data speeds or data volume of the electronic communication network.

According to an exemplary embodiment of the disclosure, an electronic signal, such as a control signal, a measurement signal, a state signal, a warning signal or such is provided and coded with the previously provided key. Subsequently, the coded electronic signal is transmitted from one communication partner to at least one other communication partner or exactly one other communication partner.

The disclosure also relates to a field device, such as a position actuator for adjusting a process fluid. An actuator can for example be formed as a control valve or pump. The field device is configured for a process plant, such as a chemical plant, a power plant, a food processing plant, or such. The field device according to the disclosure comprises a communication electronics for sending and/or receiving electronic signals, such as actuation signals, measurement signals, state signals, warning signals or such, to one or from one control electronic, respectively, for supervising, controlling and/or regulating processes of the process plant. It is thinkable that the communication electronics is only designed for the receiving of electronic signals from the control electronics. A communication electronics can be designed for both, for sending electronic signals to a control electronics and for receiving electronic signals from the control electronics. It is further thinkable that the communication electronics of the field devices are designed for sending and/or receiving electronic signals to other or from other field device(s), respectively. The communication electronics of the field device according to the disclosure has an electronic, preferably wired or wireless, signal out- and/or input for the electronic signals. For example, the field device can have a communication electronics with a HART and/or a field bus connector. It is thinkable that the communication electronics comprises a wireless signal out- and/or input, for example a WLAN or WIFI transceiver.

According to the disclosure, the field device further comprises an acoustic send and/or receiving apparatus (acoustic transceiver) for transmitting the key as acoustic signal via a pipe guiding plant fluid to the control electronics or from the control electronics. The ductwork can particularly guide a process fluid or an auxiliary energy fluid. The acoustic send and/or receiving apparatus comprises at least one acoustic signal generator, such as an acoustic signal emitter, and/or at least one acoustic signal receiver, such as a microphone. It is thinkable that the signal generator and the signal receiver is realized in function unity for example by an acoustic piezo element.

The disclosure also relates to a control electronics for a process plant, such as a chemical plant, a power plant or a food-processing plant or such, for supervising, for controlling and/or for regulating processes of the process plant. The control electronics comprises a communication apparatus (transceiver) for sending and/or receiving electronic signals such as actuation signals, warning signals or such to a or from a field device, respectively, of the process plant, such as an actuator, for example a control valve or a pump, for adjusting a process fluid. The communication apparatus is designed to process coded electronic signals with a key. The communication apparatus of the control electronics has an electronic, preferably wired or wireless, control output or input for the electronic signals. Preferably, the control electronics comprises one or more communication apparatuses with several control inputs and several control outputs. The control outputs serve to send preferably encrypted electronic signals from the control electronics to their communication partners, such as one or several field devices. The inputs of the control electronics serve the control electronics to receive relating electronic signals of the process plant, particularly measurement signals, warning signals and status signals, which can be processed by the control electronics for diagnosis, control and/or regulation purposes.

The control electronics further comprises at least one acoustic send and/or receiving apparatus (acoustic transceiver) for transmitting the key as acoustic signals via a ductwork guiding plant fluid to at least one field device or from at least one field device, respectively. It is thinkable that the control electronics communicate to one field device or several field devices the communication key as acoustic signal. It can be preferred that at least one field device or several field devices each provide an acoustic key and transmit the same via the ductwork to the control electronics. The acoustic send and/or receiving apparatus of the control electronics can be connected via an electronic communication lead with a computation unit of the control electronics and can be arranged at a distance to the computation unit of the control electronics. For example, the computation unit can be arranged in a central control center in a process plant, through which no ductwork with process fluid or auxiliary fluid is led. For this purpose, the send or receiving apparatus of the control electronics can be designed regarding the control electronics satellite-like in order to stand in physical contact with a ductwork for the transmission of the electronic signal. It is thinkable that the control electronics comprises several acoustic send and/or receiving apparatuses at several different pipes. The employment of several send and/or receiving apparatus at different pipes can for example be provided for the case that a process plant guides different process fluids or for the case that individual communication parameters of the control electronics can only be reached via a specific pipe or via a different specific pipe.

The disclosure also relates to a process plant, such as a chemical plant, for example a petrochemical plant, particularly a refinery plant, an oil drilling platform or such, a power plant, such as a nuclear power plant or a steam turbine power plant, a food-processing plant or such. The process plant comprises several tubes for guiding at least one plant fluid, such as a process fluid or an auxiliary energy fluid, at least one field device, such as an actuator, for example a control valve or a pump, for adjusting a process fluid, for the process plant and a control electronics for supervising, controlling and/or regulating processes of the process plant. The field device can be a field device according to the disclosure. The control electronics can be a control electronic according to the disclosure. The process plant according to the disclosure comprises at least one acoustic send apparatus (acoustic transmitter) for sending a key for coding electronic signals regarding the process plant, such as actuation signals, measurement signals, state signals, warning signals or such, as acoustic signal via at least one pipe. The process plant according to the disclosure further comprises at least one acoustic receiving apparatus (acoustic receiver) for receiving the key as acoustic signal via the at least one pipe. The send apparatus and the receiving apparatus are connected via the at least one pipe in such a way that an exchange of at least one key between the send apparatus and the receiving apparatus is based on acoustic communication technology.

For example, the key can be sent as acoustic pulse width modulated, amplitude modulated and/or frequency modulated signal. It can be preferred to send the acoustic signal as ultrasonic signal in a frequency range between 20 kHz and 200 kHz. Particularly, a frequency range above 30 kHz, above 60 kHz or above 90 kHz and/or below 180 kHz, 150 kHz or below 120 kHz can be preferred. It can be particularly preferred to define a frequency band with a width of 50 kHz at most, particularly 25 kHz at most, preferably 10 kHz at most, particularly preferably 5 kHz at most, for the transmission of keys as acoustic signal.

In the case of the process plant according to the disclosure, the send apparatus (transmitter) is associated with a first communication partner and the receiving apparatus with a different, second communication partner. It is therefore clear that in the process plant according to the disclosure a plurality of send apparatuses and/or a plurality of receiving apparatuses can be provided. It can be sufficient to provide a single send apparatus and at least one receiving apparatus (receiver) for the process plant according to the disclosure. Starting from a single acoustic send apparatus, one or more acoustic signals can be provided for the transmission of one or several keys for the encryption of electronic signals for the communication in the process plant. It is thinkable that the process plant has several acoustic communication networks separated from each other, wherein each single acoustic communication network of a process plant comprises at least one send apparatus and at least one receiving apparatus for the exchange of the keys. For example, the first acoustic communication network can be defined by pneumatic auxiliary energy tubes, by which the pneumatic auxiliary energy for the actuation of the pneumatic actuators can be provided. A second communication network can for example be a tube system, which guides sprinkler fluid of a fire extinguishing system of the process plant. A third acoustic communication network can be realized in the form of tubes, which guide the process fluid.

According to a further development of the process plant according to the disclosure, the at least one tube for transmitting the key as acoustic signal is entirely accommodated in a physical screen, such as a wall, a fence or such. The entire accommodation of the tube or the acoustic communication network for transmitting the key as acoustic signal ensures that an unauthorized access from outside the process plant to the acoustic communication network is practically excluded.

According to a further development of the process plant, the at least one acoustic send apparatus and/or the at least one acoustic receiving apparatus is designed to use the tube wall of the ductwork as transmission medium. Alternatively, or additionally, the acoustic send apparatus and/or the acoustic receiving apparatus are arranged at the ductwork. For example, the steam turbine power plant changes the process medium water between the front aggregate conditions (gaseous, vaporous, fluid) so that the process medium itself is only well-suited for the fast and reliable transmission of acoustic signals in a limited range, particularly in a range of fluid process medium, because particularly aggregate state transitions can effectuate an impairment of the transmission of acoustic signals. The transmission of acoustic signals in the ductwork wall, which is for example formed of metal, particularly steel, can take place with a higher velocity of sound compared for example in a water, gas or water-vapor medium.

According to a further development of the process plant according to the disclosure, the at least one acoustic send apparatus and/or the at least one acoustic receiving apparatus is designed for the employment of the plant fluid as transmission medium. For example, for the case of chemical plants, which can have particularly corrosion resistant pipes of materials, such as ceramics, plastics or such, it is thinkable that the pipe wall materials are less suitable as transmission medium for acoustic signals than the guided process fluid or an auxiliary fluid. Alternatively, or additionally, the at least one acoustic send apparatus and/or the at least one acoustic receiving apparatus can be arranged in the ductwork.

It shall be clear that the term "ductwork" can be used predominantly as collective term for any components of the process plant guiding plant fluid, which can include process fluid, auxiliary fluid, etc. Ductworks can in so far comprise tubes without additional function, such as also process fluid guiding field devices, such as control valves, pumps, etc., plant fluid reservoirs, reactor vessels, which are flooded with process fluid. Preferably, a ductwork forms a particularly closed receptacle, in which at least one process fluid is guided. It is thinkable that in the ductwork several process fluids, for example process fluid mixtures, multiphase process media or additional media, such as inert gases, fill materials, ambient air or such are present. It can be preferred that a tube or at least a part of the ductwork network of a process plant, respectively, is closed or closeable against the ambience.

A further development of a process plant according to the disclosure further comprises at least one acoustic signal repeater, which is arranged at the ductwork between the at least one acoustic send apparatus and the at least one acoustic receiving apparatus. The acoustic signal repeater is configured to receive, possibly amplify, an acoustic signal of the at least one acoustic send apparatus and to send an acoustic signal to the at least one acoustic receiving apparatus. The sending of the acoustic signal from the acoustic signal repeater can particularly take place via at least one further acoustic signal repeater to the at least one acoustic receiving apparatus. The acoustic signal repeater can be implemented in a field device according to the disclosure. An acoustic signal repeater can particularly be of advantage for large acoustic communication networks or large process plants, respectively for the reliable transmission of acoustic signals.

According to a further development of a process plant according to the disclosure, said plant comprises at least one key server apparatus that comprises an acoustic send and/or receiving apparatus for transmitting the key as acoustic signal. The key server apparatus can be implemented in a field device according to the disclosure. It is thinkable that the key server apparatus and an acoustic signal repeater apparatus are combined with each other. The key server apparatus is particularly designed for transmitting at least one key, preferably numerous keys, as acoustic signal particularly via a ductwork guiding process fluid, preferably at the or from the control electronics, respectively and/or preferably at at least one or from at least one field device, respectively. The key server apparatus comprises a data storage for several keys. It is thinkable that the acoustic communication network at a process plant according to the invention is designed with a specifically configured key server apparatus in which the communication partners of the plant are providing one or several acoustic keys. The provision of keys can take place exclusively starting from the key server apparatus. It is thinkable that the control electronics, such as a control center of the process plant communicates with a key server apparatus in order to instruct the key server apparatus to generate one or several keys and to acoustically provide to the communication partners in the process plant. For example, the control electronics itself that can be in connection with the internet, can be screened from a direct contact with the one or more acoustic network(s) of the process plant and only be able to communicate with a key server apparatus for initiating the provision of one or more keys by the key server apparatus, wherein particularly the control electronics does not exchange any information regarding the key with the key server apparatus, particularly does not provide directions regarding the definition of the key and particularly no information about the specification of the key, such as for example its length, its content or the implementation of the acoustic communication technology, which is needed for employing the key via the acoustic network.

Figure 1:
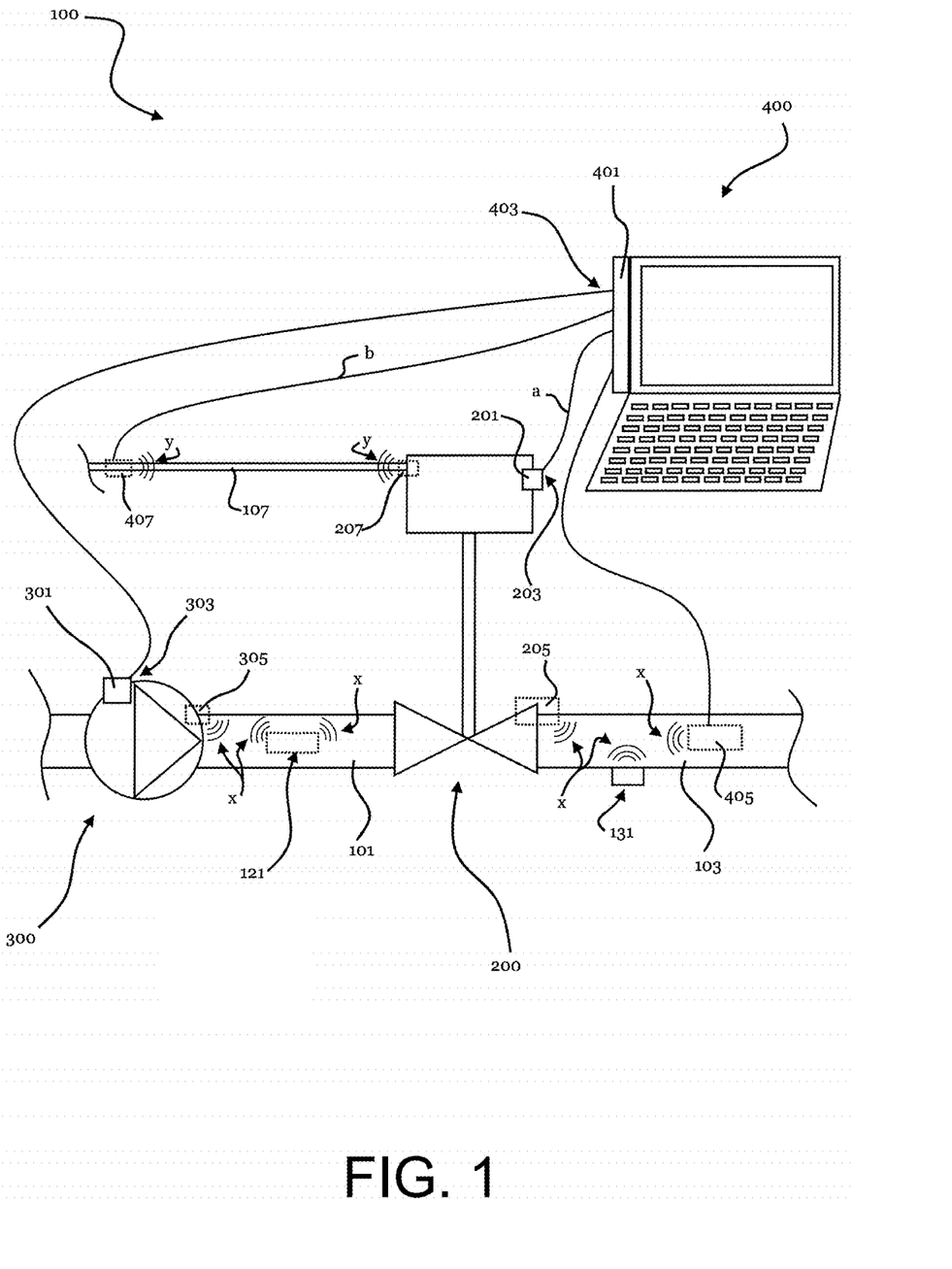
FIG. 1 is a schematic depiction of the process plant with field devices and a controller according to an exemplary embodiment of the present disclosure.

A plant according to the disclosure is in general denoted with reference numeral 100. The plant comprises as main components several tubes 101, 103, 107 for guiding plant fluid, several field devices, which are shown exemplarily in the form of an actuator 200 and a pump 300, as well as a control electronics (controller) 400.

FIG. 1 shows a process plant 100 according to an exemplary embodiment. In this example, a ductwork system guiding process fluid is shown, which is composed of a process fluid pump 300, a ductwork section 101 and 103 connected to it, which are connected to each other by a control valve 200. The control valve 200 has a pneumatic actuator, which is supplied with compressed air via the pneumatic tube 107.

The field devices shown, that means the actuator 200 and the pump 300, are respectively equipped with a communication electronics 201 and 301, respectively, which are connected to a communication device 401 of the control electronics 400 via an electronic communication lead.

The control electronics 400 can communicate a target rotational speed to the pump for example via the control output 403 of the communication device 401. The target rotational speed is received by the communication electronics 301 of the pump 300 and communicated to a not further depicted control electronics of the pump 300 in order to activate the pump respectively. The communication electronics 301 has a signal input 303, at which the same receives the actuation signal s. According to the method according to the disclosure the actuation signal s can be an encrypted electronic signal. In an exemplary embodiment, the communication electronics 201 and/or 301 include processor circuitry that is configured to perform one or more functions and/or operations of the electronics 201/301. In an exemplary embodiment, the control electronics 400 includes processor circuitry that is configured to perform one or more functions and/or operations of the control electronics 400.

The actuator 300 has a not depicted control electronics (controller), which cooperates with the communication electronics 201 of the control valve 200. Electronic data regarding the state of the control valve 200 can be sent to the control electronics 400 via the communication electronics 201 of the control valve 200, for example the actual position of the valve member, a current actuation pressure in the pneumatic actuation chamber of the control valve, a current process fluid pressure upstream of the control valve 200, a current process fluid pressure downstream of the control valve 200 or such. In case the electronics of the control valve 200 has diagnosis functionalities, the communication electronics of the control electronics 400 can send processed diagnosis data and/or state data regarding the control valve 200 besides the current measurements values (see above).

The electronic signals of the control valve 200 are output to the signal output 203 for example wiredly or via radio in order to be able to be received at the control input 403 of the control electronics 400. The control electronics 400 can be configured to send electric signals to the control valve 200 via the communication device 401, such as a target actuation signal, an emergency closing signal or such. The signals of the control electronics 400 are sent to the control valve 200 at the signal output 403 in order to be received by its signal input 203. In this example, the interfaces 203 and 403, respectively, are bidirectional, that means are embodied as signal outlet and/or inlet 203 or as control signal outlet and/or inlet 403. The electronic signals a, which can be interchanged between the communication electronics 201 of the control valve and the communication device 401 of the control electronics 400 can be communicated encryptedly according to the disclosure. In an exemplary embodiment, the communication device 401 includes processor circuitry that is configured to perform one or more functions and/or operations of the communication device 401.

A field device according to the disclosure, for example the control valve shown in FIG. 1, can for example have an acoustic send and/or receiving apparatus (acoustic transceiver) 205 for the process fluid lead 101, 103. Alternatively, or additionally, the control valve 200 according to the disclosure can have an acoustic send and/or receiving apparatus (acoustic transceiver) 207 configured to transmit an acoustic signal y via a pneumatic lead 107 guiding auxiliary fluid. The acoustic send and/or receiving apparatus 207 for the pneumatic fluid lead 107 can for example be configured to transmit an ultrasonic signal in the range above 20 kHz through the wall of the pneumatic lead 107. A pneumatic lead 107 can be mounted at an acoustic receiving apparatus (acoustic receiver) 407 of the control electronics 400 at a distance to the control valve 200. Since the control electronics 400 is typically arranged in an office-like area of the process plant, wherein the pneumatic fluid lead 107 can for example be arranged in an explosive secured area of the process plant 100, the connection lead b between the acoustic receiving apparatus 407 and the correspondingly arranged control electronics 400 can be provided.

A key generated in the actuation regulation electronics of the control valve 200 (not further depicted) for the exchange of electronic signals a between the control electronics 400 and the control valve 200 can be converted into an acoustic signal y. The key can be sent as acoustic signal y from the acoustic send and/or receiving apparatus 207 via the wall of the pneumatic fluid tube 107 to the acoustic receiving apparatus 407 of the control electronics 400. The receiving apparatus 407 of the control electronics 400 can comprise an acoustic digital converter configured to generate an electronic, encrypted signal b for the control electronics 400. By means of the acoustic signal transfer y from the control valve 200 to the control electronics 400, the acoustic signals y regarding the key of the control valve 200 can be transmitted to the control electronics which is to be used for the encryption of the electronic signals a.

Alternatively, or additionally, the control valve 200 can have an acoustic send apparatus (acoustic transmitter) 205 configured to send acoustic signals x via the ductwork system 101, 103 guiding process fluid, wherein the process fluid itself can serve as carrier medium. The acoustic send apparatus 205 can be configured to emit acoustic signals x in the process fluid. A key server apparatus 131 can be arranged at or in the ductwork 103, the key server apparatus 131 can receive or archive the acoustic signals x, which represent keys for the electronic communication between the control valve 200 and other components of the process plant 100. It is thinkable that the key server provides the keys for the communication between different communication partners of the process plant 100 and sends respective acoustic signals x. The server apparatus 131 can for example provide a key for the secure communication between the control valve 200 and the control electronics 400 and send the acoustic signal x via the process fluid in the process fluid feed 103.

Acoustic receiving apparatuses 205 and 405 of the control valve 200 and of the control electronics 400 can receive these acoustic signals x. The key server apparatus 131 can for example generate and emit an acoustic signal x, which represents a key for the encrypted communication between the control valve 200 and the control electronics 400, on initiation from the control electronics 400 or in regular intervals. The transmission of electronic signals a between the control valve 200 and the control electronics 400 can take place with a key provided afterwards by the key server apparatus 131. If a new key is sent out as acoustic signal x from the server apparatus 131 after a predetermined time interval, the new key for the encryption of electronic signals can be used from this moment on. A key server apparatus 131 can alternatively be used to receive rows of keys, for example from the control electronics 400 via the acoustic send apparatus 405, as acoustic signal x and to save and to provide on demand, on initiation or in regular intervals as acoustic signal x of the acoustic signal receiving apparatus 205 of the control valve 200, etc.

A further field device, for example the pump 300, can have an individual acoustic send apparatus 305 for the determination of acoustic signals x by the process fluid. If the distance between the acoustic send and/or receiving apparatus 305 of the pump 300 and the acoustic send and/or receiving apparatus 405 of the control electronics 400 is so great that it has to be expected that the signal transmission is not sufficiently high in quality in order to transmit a key with sufficient quality between both acoustic send and/or receiving apparatuses of the different communication partners (here: pump 300 and control electronics 400), an acoustic signal repeater 121 can be provided, which amplifies and re-transmits each received acoustic signal x.

The acoustic signal repeater 121 can also be part of a chain of repeaters. Also the acoustic send and/or receiving apparatuses 205 for example of the control valve 200 or another field device can be configured to act as acoustic signal repeater. For the case of the shown example, an acoustic signal can for example be transmitted from the acoustic transducer 305 of the pump 300 as acoustic signal x via the process fluid to the acoustic signal repeater 121 in order to be sent from there as amplified and apart from that equal acoustic signal x to the acoustic send and/or receiving apparatus 205 of the control valve 200. The acoustic send and/or receiving apparatus 205 of the control valve 200 (or of another field device of the process plant 100) can receive, amplify and forward and acoustic signal x, which is not addressed to the control valve 200, for example to the acoustic signal receiver 405 of the control electronics 400. The key communicated by the control electronics 400 can be used for the encryption of the electronic signals s from the control electronics 400 to the pump 300.

The features disclosed in the previous description, the Figures and the claims can be of importance for the realization of the disclosure in the different embodiments in both, individually and in arbitrary combinations.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein. In one or more exemplary embodiment, one or more of the components 131, 121, 201, 202, 301, 203, 303, 205, 207, 305, 405, 407, 400, 401, and 403 include processor circuitry that is configured to perform one or more respective functions and/or operations.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

100 plant
101, 103, 107 pipes/ductwork
131 key server apparatus
121 acoustic signal repeater
200 control valve
201, 202, 301 communication electronics
203, 303 signal input and output, respectively
205, 207, 305 405, 407 acoustic send and/or receiving apparatus (acoustic transmitter, receiver, or transceiver)
300 pump
400 control electronics (controller)
401 communication device
403 control input and control output, respectively
a electronic signal
b electronically encrypted signal
x, y acoustic signal
s actuation signal

The invention claimed is:

1. A method for encryption of communications in a process plant between at least a first communication partner and a second communication partner, the first and second communication partners including at least one field device configured to adjust a process fluid of the process plant and/or control electronics configured to control processes of the process plant, the method comprising:
providing an electronic signal;
providing a key for coding of electronic signals associated with the process plant;
coding the provided electronic signal with the key;
transmitting, using an acoustic transmitter, the key as acoustic signal via a first communication network formed by a ductwork guiding plant fluid from the first communication partner to the second communication partner, a wall of the ductwork being used as a transmission medium for transmitting the acoustic signal, wherein the acoustic transmitter is arranged at the ductwork; and
transmitting, using a second communication network, the coded signal from one of the first and second communication partners to the other of the first and second communication partners, wherein the second communication network is different from the first communication network.

2. The method according to claim 1, wherein the process plant is a chemical plant, a power plant, or a food-processing plant.

3. The method according to claim 1, wherein the acoustic signal is further transmitted within the ductwork so as to use the plant fluid as an additional transmission medium.

4. The method according to claim 1, wherein the first communication network uses a different transmission medium than the second communication network.

5. The method according to claim 1, wherein the first communication network is an acoustic signal communication network and the second communication network is an electronic signal communication network.

6. A field device for adjusting a process fluid of a process plant, the field device comprising:
communication electronics configured to send and/or receive electronic signals to and from a control electronics, respectively, via a first communication network, the control electronics being configured to control processes of the process plant, wherein the communication electronics are configured to process electronic signals coded with a key, the communication electronics including a wired or wireless signal output and/or input for the electronic signals; and
an acoustic transceiver configured to: transmit the key as an acoustic signal via a second communication network formed by a ductwork guiding plant fluid at the control electronics and from the control electronics, respectively, and use a wall of the ductwork as a transmission medium for the transmitted acoustic signal, wherein the acoustic transceiver is arranged at the ductwork, wherein the second communication network is different from the first communication network.

7. Control electronics for a process plant and configured to control processes of the process plant, the control electronics comprising:
a transceiver configured to:
send and/or receive electronic signals, via a first communication network, to a field device and from the field device, respectively, of the process plant to adjust a process fluid, and
process the electronic signals coded with a key, wherein the transceiver includes a wired or wireless electronic control output and/or input for the electronic signals; and
at least one acoustic transceiver arranged at ductwork guiding plant fluid to and from the field device, the least one acoustic transceiver being configured to: communicate, via a second communication network, the key as an acoustic signal via the ductwork guiding the plant fluid to and from the field device, and use a wall of the ductwork as a transmission medium for the transmitted acoustic signal, wherein the second communication network is different from the first communication network.

8. A process plant having one or more tubes for guiding at least one plant fluid to and/or from at least one field device configured to adjust the plant fluid, and a control electronics configured to control one or more processes of the process plant, the process plant comprising:
communication electronics configured to:
send and/or receive electronic signals to and from the control electronics, respectively, via a first communication network, and
process the electronic signals coded with a key;
at least one acoustic transmitter configured to transmit a key for coding electronic signals associated with the process plant as an acoustic signal via a second communication network formed by at least one tube of the one or more tubes, the at least one acoustic transmitter being arranged at the at least one tube, wherein a wall of the at least one tube is used as a transmission medium for the transmitted acoustic signal; and
at least one acoustic receiver arranged at the at least one tube and configured to receive the key as the acoustic signal via the second communication network formed by the at least one tube, second communication network being different from the first communication network,
wherein the at least one acoustic transmitter and the at one acoustic receiver are connected via the at least one tube such that an exchange of the key between the acoustic transmitter and the acoustic receiver is based on acoustic communication technology.

9. The process plant according to claim 8, wherein the at least one tube for transmitting the key as the acoustic signal is entirely accommodated in a physical wall to form a tube wall.

10. The process plant according to claim 8, wherein the at least one acoustic transmitter and/or the at least one acoustic receiver is further arranged in the at least one tube.

11. The process plant according to claim 8, wherein the at least one acoustic transmitter and/or the at least one acoustic receiver is configured to further use the plant fluid as the transmission medium.

12. The process plant according to claim 8, further comprising at least one acoustic signal repeater arranged at the one or more tubes between the at least one acoustic transmitter and the at least one acoustic receiver, and which is configured to receive the acoustic signal from the at least one acoustic, amplify the received acoustic signal to generate an amplified acoustic signal, and send the amplified acoustic signal to the at least one acoustic receiver.

13. The process plant according to claim 8, further comprising at least one key server having a data storage storing one or more keys and configured to generate the one or more keys and transmit one or more of the keys as respective one or more acoustic signals via the one or more tubes guiding the at least one plant fluid at the and from the control electronics, respectively, and/or to the at least one and from the at least one field device, respectively.

14. The process plant according to claim 8, wherein: the communication electronics include a wired or wireless signal output and/or input for the electronic signals; and
the at least one field device comprises an acoustic transceiver configured to transmit the key as the acoustic signal via the second communication network formed by ductwork guiding plant fluid at the control electronics and from the control electronics, respectively.

15. The process plant according to claim 14, wherein the control electronics comprise:
a transceiver configured to:
send and/or receive electronic signals, via the first communication network, to the field device and from the field device, respectively, of the process plant to adjust the plant fluid, and
process the electronic signals coded with the key, wherein the transceiver includes a wired or wireless electronic control output and/or input for the electronic signals; and
at least one acoustic transceiver that is configured to communicate the key as an acoustic signal via the second communication network formed by the ductwork guiding plant fluid to and from the at least one field device.

16. The process plant according to claim 8, wherein the control electronics comprise:
a transceiver configured to:
send and/or receive electronic signals, via the first communication network, to the field device and from the field device, respectively, of the process plant to adjust the plant fluid, and
process the electronic signals coded with the key, wherein the transceiver includes a wired or wireless electronic control output and/or input for the electronic signals; and at least one acoustic transceiver that is configured to communicate the key as an acoustic signal via the second communication network formed by ductwork guiding plant fluid to and from the at least one field device.

17. The process plant according to claim 8, wherein the at least one field device is an actuator.

18. The process plant according to claim 17, wherein the actuator is a control valve or a pump.

19. The process plant according to claim 8, wherein the electronic signals comprise one or more actuation signals, one or more measurement signals, one or more state signals, and/or one or more warning signals.

20. A non-transitory computer-readable storage medium with an executable program stored thereon, wherein, when executed, the program instructs a processor to perform the method of claim 1.

* * * * *